United States Patent [19]
Gerson

[11] 4,332,009
[45] May 25, 1982

[54] MEMORY PROTECTION SYSTEM

[75] Inventor: I. Steve Gerson, Dallas, Tex.

[73] Assignee: Mostek Corporation, Carrollton, Tex.

[21] Appl. No.: 113,621

[22] Filed: Jan. 21, 1980

[51] Int. Cl.³ .............................................. G06F 7/00
[52] U.S. Cl. ................................................... 364/200
[58] Field of Search ... 364/200 MS File, 900 MS File; 365/195, 196

[56] References Cited

U.S. PATENT DOCUMENTS

| Re. 27,239 | 11/1971 | Ulrich | 364/200 |
|---|---|---|---|
| 3,264,615 | 8/1966 | Case et al. | 364/200 |
| 3,328,765 | 6/1967 | Amdahl et al. | 364/200 |
| 3,576,544 | 4/1971 | Cordero et al. | 364/200 |
| 4,093,986 | 6/1978 | Bodner et al. | 364/200 |
| 4,128,874 | 12/1978 | Pertl et al. | 364/200 |

Primary Examiner—Gareth D. Shaw
Assistant Examiner—Thomas M. Heckler

[57] ABSTRACT

A memory protect circuit (12) is provided for protecting inadvertent alteration of data stored in a data storage unit (32) of a data processing system (10). The data processing system (10) includes a microprocessor (14) for generating an address signal to selected storage locations of the storage unit (32) and for generating a key code prior to generation of the address signal. The write protect circuitry (12) includes decode circuitry (50) for receiving the key code and for generating a decoded key code. A latch (54) receives the decoded key code and generates a control signal upon receipt of the decoded key code. A NAND gate (62) receives the control signal and the address signal to generate an access signal for application to the storage unit (32) to permit alteration of data stored at a selected storage location of the storage unit (32) through a write operation. Latch (54) prevents generation of the control signal immediately following a write operation unit receipt by the decode circuitry (50) of a subsequently generated key code.

6 Claims, 2 Drawing Figures

MEMORY PROTECTION SYSTEM

BACKGROUND ART

Data processing systems having electronic data handling capability typically utilize storage devices, usually referred to as memories for holding items of information employed in or manipulated by the data handling system. A memory usually comprises a plurality of addressable storage locations, each adapted to store an item of data or word, in the form of a plurality of binary bits. Each word location has an address which defines its position in the memory. Access to a location for the purposes of storing a word therein or reading out a word previously stored is gained by specifying the proper address along with a command or instruction specifying the operation to be performed at that specific address, either a write operation or a read operation.

Most memory systems employ an ordered arrangement of address numbers to identify the individual addressable location, although the specific form of the address and the manner of storing and retrieving words in a memory may vary with the particular type of memory utilized. Each memory location has associated therewith a different address made up of a unique combination of the total number of address bits. Electronic data processing systems employ complex manipulations of data and instruction words stored in memory which frequently involve modification of addresses by indexing and indirect addressing and transfers of words from location to location within the memory. Accidental destruction of data or instruction words through program errors, operator's errors or various machine errors, are possible in such complex memory systems.

Various systems have been developed to ensure the protection of data stored in memory storage devices. One such system prevents alteration of data wherein a key associated with the program or routine making the access is compared with a key associated with a particular area of memory being accessed. Such a system is described in U.S. Pat. No. 3,576,544 issued Apr. 27, 1971 to Cordero, Jr. et al and entitled "Storage Protection System". Additional systems have been developed to protect blocks of storage from access by two or more independent programs operating at the same time. Such systems are described in U.S. Pat. No. 3,328,765 issued to Amdahl et al on June 27, 1967 and entitled "Memory Protection System" and U.S. Pat. No. 3,264,615 issued to Case et al on Aug. 2, 1966 and entitled "Memory Protection System". Such systems, however, involve complex electronic circuitry and only protect designated areas of memory rather than individual addressable storage locations of memory.

A need has thus arisen for a memory protect device for an electronic data handling apparatus whereby addressable storage locations in the apparatus memory are protected from inadvertent use. Such a memory protect device must, when desired, operate to protect each addressable storage location to enable only one write operation to occur. A need has further arisen for a memory protect device controllable by a processor independent of operator control.

DISCLOSURE OF THE INVENTION

In accordance with the present invention, a memory protect device is provided for addressable storage locations of a memory apparatus to prevent inadvertent write operations and resulting destruction of stored data.

In accordance with the present invention, a memory protect circuit for preventing inadvertent alteration of data stored in a storage unit of a data processing system having a processor for generating an address signal to selected storage locations of the storage unit and for generating a key code prior to generation of the address signal is provided. Circuitry is provided for receiving the key code and for generating a decoded key code. A control circuit receives the decoded key code and generates a control signal upon receipt of the decoded key code. Circuitry is further provided for receiving the control signal and the address signal to enable the address signal to be applied to the storage unit to permit alteration of data stored at the selected storage location of the storage unit. Circuitry is further provided for preventing generation of the control signal immediately following a write operation until receipt of a subsequently generated key code.

In accordance with another aspect of the present invention, a memory protect circuit is provided for use in a data processing system having a processor for generating an address signal to selected storage locations of a storage unit and for generating a key code prior to generation of the address signal. A decoder is provided to receive the key code and to generate a decoded key code. A latch circuit receives the decoded key code and generates a control signal upon receipt of the decoded key code. An AND gate receives the control signal and the address signal to enable the address signal to be applied to the storage unit to permit alteration of data stored at the selected storage location of the storage unit. The latch circuit prevents generation of the control signal immediately following a write operation until the decoder receives a subsequently generated key code.

BRIEF DESCRIPTION OF DRAWINGS

For a more complete understanding of the present invention and for further objects and advantages thereof, reference will now be made to the following Detailed Description taken in conjunction with the accompanying Drawings in which.

DETAILED DESCRIPTION

Figure 1:
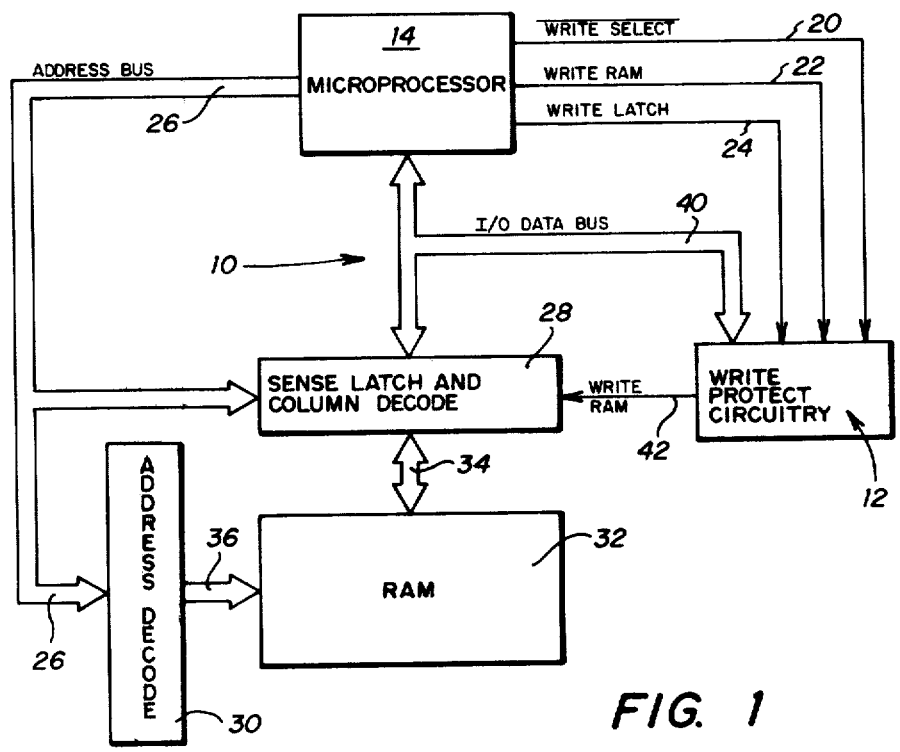
FIG. 1 is a block diagram of a data processing system utilizing the write protect circuitry of the present invention.

Referring to FIG. 1, a data processing system generally identified by the numeral 10 is illustrated. Data processing system 10 utilizes the write protect circuitry of the present invention which is generally identified by the numeral 12. Write protect circuitry 12 receives inputs from a microprocessor 14. Microprocessor 14 generates the WRITE SELECT, WRITE RAM and WRITE LATCH signals via signal lines 20, 22 and 24 for application to write protect circuitry 12. Microprocessor 14 receives inputs from input/output devices (not shown) and transfers data via an address bus 26 to a sense latch and column decode circuit 28 and an address decode circuit 30. Sense latch and column decode circuit 28 functions to decode address information from microprocessor 14 to provide a column select address for a selected column of storage locations within a random access memory (RAM) 32 via a data bus 34. Address decode circuit 30 further decodes address information supplied from microprocessor 14 via address bus 26 to generate the row address necessary to identify a particular storage location within RAM 32. Address decode circuit 30 communicates with RAM 32 via a bus 36. Microprocessor 14, sense latch and column decode circuit 28 and write protect circuitry 12 of the present invention communicate via an input/output data bus 40.

Write protect circuitry 12 permits a RAM WRITE signal via signal line 42 to be applied to sense latch and column decode circuit 28. Generation of the RAM WRITE signal permits data from microprocessor 14 to be written into a selected or addressed storage location of RAM 32. If the RAM WRITE signal is not generated, no alteration of data, through a write operation, can be performed by microprocessor 14 to alter the contents of data stored in RAM 32.

Figure 2:
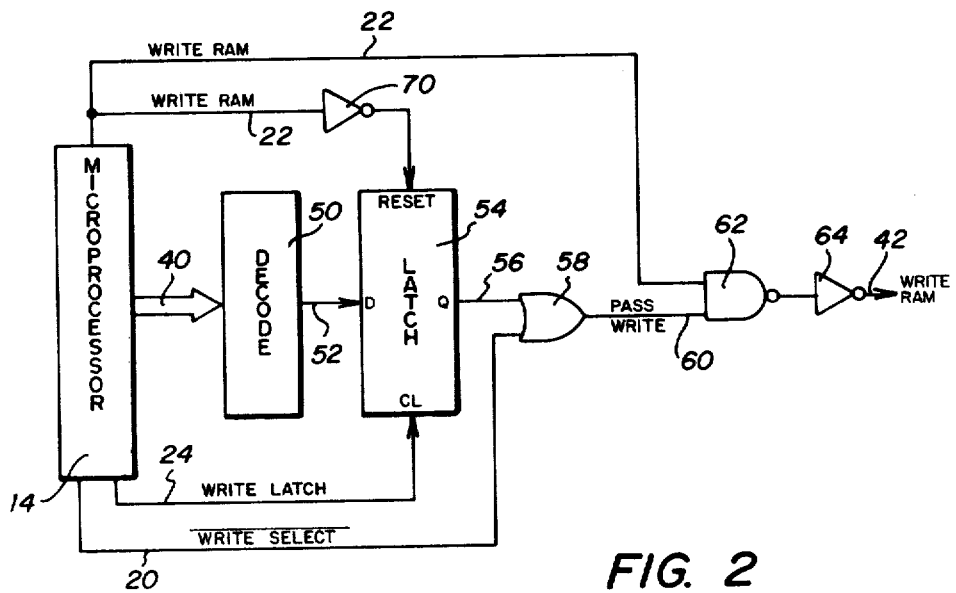
FIG. 2 is a schematic circuit diagram of the present write protect circuitry.

Referring to FIG. 2, wherein like numerals are utilized for like and corresponding components previously identified, the write protect circuitry 12 of the present invention is illustrated. Microprocessor 14 generates via I/O data bus 40 a key code for application to a decode circuit 50. The key code is generated by microprocessor 14 from a different set of control signals than used by microprocessor 14 to generate the WRITE RAM signal. The key code is generated prior to generation of each address signal generated by microprocessor 14 for the purpose of accessing RAM 32 and may comprise, for example, a hexidecimal representation of the number 55. Decode circuit 50 may comprise, for example, an 8-input, one-output NOR gate with appropriate inverters (not shown) to establish the code and functions to generate a decoded key applied via signal line 52 to a latch 54. If the proper key code has been generated by microprocessor 14, decoded via decode circuit 50 and received via latch 54, a control signal is generated by latch 54 via signal line 56 for application to an OR gate 58. OR gate 58 generates via signal line 60 a PASS WRITE signal for application to a NAND gate 62.

The WRITE RAM signal generated by microprocessor 14 via signal line 22 is also applied to NAND gate 62. If both the PASS WRITE signal and WRITE RAM signal are present at the input to NAND gate 62, an output is generated to an inverter 64 to pass the RAM WRITE signal via signal line 42 to be applied to sense latch and column decode circuit 28 (FIG. 1). If the PASS WRITE signal had not been generated due to receipt of an improper key code or failure to receive the key code, the RAM WRITE signal would not have been generated and no write operation could have taken place. The inadvertent writing of data into RAM 32 (FIG. 1) would thus have been prevented.

Latch 54 is clocked by the WRITE LATCH signal via signal line 24 after decode circuit 50 has had sufficient time to generate the decoded key onto signal line 52. Latch 54 is reset via the WRITE signal applied via signal line 22 through an inverter 70. Latch 54 is reset on the rising edge of signal line 70 corresponding to the active-to-inactive transition of the WRITE RAM signal on signal line 22, such that for each subsequent RAM write operation the proper decoded key word must be received by latch 54 before latch 54 can generate an output to OR gate 58. The present write protect circuitry 12 therefore provides protection for each write operation to prevent inadvertent alteration of data written into RAM 32 for each write operation.

Microprocessor 14 also generates the WRITE SELECT signal via signal line 20 which is applied to OR gate 58. The WRITE SELECT signal disables write protect circuitry 12, such that RAM 32 can be written to and function as a standard read/write memory device.

It therefore can be seen that RAM 32 is protected from inadvertent alteration of stored data for each write operation under control of microprocessor 14. Write protect circuitry 12 operates free of operator control since microprocessor 14 enables and disenables the write protect circuitry 12 to provide for a reliable system. After each write cycle, the write protect circuitry of the present invention is reset such that no additional RAM write cycles can occur until the present circuitry is again written to with the key code generated by microprocessor 14.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A memory protect circuit for preventing inadvertent alteration of data stored in a storage unit of a data processing system having a processor for generating an address enable signal to enable an address signal to be applied to selected storage locations of the storage unit and for generating a key code prior to generation of the address enable signal comprising:

receiving means for receiving the key code and for generating a decoded key code;

latch means for receiving said decoded key code and for generating a control signal upon receipt of said decoded key code;

means for receiving said control signal and the address enable signal to permit the address enable signal to be applied to the storage unit to permit alteration of data stored at the selected storage location of the storage unit through a write operation; and means for preventing generation of said control signal immediately following a write operation to thereby prevent subsequent write operations until receipt by said receiving means of a subsequently generated key code.

2. The memory protect circuit of claim 1 wherein said means for receiving the key code comprises decode means.

3. The memory protect circuit of claim 1 wherein said means for receiving said control signal comprises NAND gate means.

4. A memory protect circuit for controlling the writing of data into a data storage unit of a data processing system having a processor for generating an address enable signal to enable an address signal to be applied to a selected storage location of the storage unit and for generating a key code prior to generation of the address enable signal comprising:

decode means for receiving the key code and for generating a decoded key code;

latch means for receiving said decoded key code and for generating a control signal upon receipt of said decoded key code;

means for receiving said control signal and the address enable signal to permit the address enable signal to be applied to the storage unit to allow writing of data into the selected storage location of the storage unit; and said latch means being enabled for each write operation of the processor and disabled following each write operation of the processor.

5. The memory protect circuit of claim 4 wherein said decode means comprises NOR gate means.

6. The memory protect circuit of claim 4 and further including:

OR gate means for receiving said control signal and for receiving a disable signal generated by the processor to bypass the write protect circuit to enable successive write operations for writing data to the storage unit in the absence of said control signal.

* * * * *